US011988002B2

(12) United States Patent
Sturm

(10) Patent No.: US 11,988,002 B2
(45) Date of Patent: May 21, 2024

(54) SUPPORTING DEVICE FOR THE CONSTRUCTION INDUSTRY, ARRANGEMENT CONSISTING OF AT LEAST TWO SUCH SUPPORTING DEVICES, INCREMENTAL LAUNCHING DEVICE COMPRISING AT LEAST ONE SUCH SUPPORTING DEVICE, AND METHOD FOR SUPPORTING A LOAD ELEMENT USING SUCH A SUPPORTING DEVICE

(71) Applicant: PERI SE, Weissenhorn (DE)

(72) Inventor: Florian Sturm, Unterroth (DE)

(73) Assignee: PERI SE, Weissenhorn (DE)

( * ) Notice: Subject to any disclaimer, the term of this patent is extended or adjusted under 35 U.S.C. 154(b) by 770 days.

(21) Appl. No.: 16/979,511

(22) PCT Filed: Mar. 6, 2019

(86) PCT No.: PCT/DE2019/100201
§ 371 (c)(1),
(2) Date: Sep. 9, 2020

(87) PCT Pub. No.: WO2019/170196
PCT Pub. Date: Sep. 12, 2019

(65) Prior Publication Data
US 2021/0040755 A1 Feb. 11, 2021

(30) Foreign Application Priority Data
Mar. 9, 2018 (DE) ...................... 10 2018 203 612.8

(51) Int. Cl.
*E04G 25/04* (2006.01)
*E01D 19/12* (2006.01)
(Continued)

(52) U.S. Cl.
CPC ........... *E04G 25/04* (2013.01); *E01D 19/125* (2013.01); *E01D 21/065* (2013.01); *E04B 1/003* (2013.01);
(Continued)

(58) Field of Classification Search
CPC ... E04G 25/04; E04G 2025/045; E04G 11/48; E04G 17/16; E01D 19/125; E01D 21/065;
(Continued)

(56) References Cited

U.S. PATENT DOCUMENTS 1,580,243 A 4/1926 Grunt
2,564,935 A 8/1951 Templeton
(Continued)

FOREIGN PATENT DOCUMENTS

AT 327503 B 2/1976
DE 2638361 A1 * 3/1978 ........... E01D 21/065
(Continued)

*Primary Examiner* — Kyle J. Walraed-Sullivan
(74) *Attorney, Agent, or Firm* — SLEMAN & LUND LLP

(57) ABSTRACT

A supporting device for the construction industry. Said device has a fixing element which rests against a side wall and is fixed at a fixing point of the side wall. Said device also has a cantilever which is connected to the fixing element and, when the fixing element is in the fixed state, projects from the side wall such that a load element can rest against a bearing point of a bearing element of the cantilever. The load element can now be displaced in a displacement direction substantially parallel to the side wall relative to the cantilever and, when the load element rests against the bearing element of the cantilever, the cantilever is coupled to the load element such that a displacement force component acts on the cantilever in the displacement direction when the load element is displaced, said displacement force component resulting in a torque on the cantilever.

22 Claims, 5 Drawing Sheets

(51) Int. Cl.
*E01D 21/06* (2006.01)
*E04B 1/00* (2006.01)
*E04G 11/48* (2006.01)
*E04G 11/50* (2006.01)
*E04G 17/16* (2006.01)
*F16M 13/02* (2006.01)
*E01D 101/24* (2006.01)
*E04G 11/38* (2006.01)
*E04G 25/00* (2006.01)

(52) U.S. Cl.
CPC ............ *E04G 11/48* (2013.01); *E04G 11/483* (2013.01); *E04G 11/486* (2013.01); *E04G 11/50* (2013.01); *E04G 17/16* (2013.01); *F16M 13/022* (2013.01); *E01D 2101/24* (2013.01); *E04G 11/38* (2013.01); *E04G 2025/003* (2013.01); *E04G 2025/006* (2013.01); *E04G 2025/045* (2013.01); *F16M 2200/021* (2013.01); *F16M 2200/025* (2013.01)

(58) Field of Classification Search
CPC ..... E01D 2101/24; E01D 19/12; E01D 21/06; E04B 1/003; F16M 13/022; F16M 2200/021; F16M 2200/025
See application file for complete search history.

(56) References Cited

U.S. PATENT DOCUMENTS

| | | |
|---|---|---|
| 3,797,793 A | 3/1974 | Moritz |
| 3,815,858 A | 6/1974 | Mocny |
| 5,755,981 A | 5/1998 | Payne |
| 5,865,410 A | 2/1999 | Horen |

FOREIGN PATENT DOCUMENTS

| | | | | |
|---|---|---|---|---|
| DE | 2905795 A1 | * | 8/1979 | ........... E01D 21/065 |
| DE | 3515498 C | * | 6/1986 | ........... E01D 19/048 |
| DE | 3874172 T2 | | 3/1993 | |
| DE | 202012009619 U1 | | 11/2012 | |
| EP | 2573269 A1 | * | 3/2013 | |
| FR | 2364297 A | * | 5/1978 | ........... E01D 19/048 |
| KR | 20060122987 A | * | 12/2006 | ........... E01D 21/065 |
| KR | 669445 B1 | * | 1/2007 | ............ E01D 21/00 |
| KR | 20070001483 | | 1/2007 | |
| KR | 20120049201 A | * | 5/2012 | ........... E01D 21/065 |
| KR | 101214602 B1 | * | 12/2012 | ........... E01D 19/125 |
| KR | 20130141275 A | * | 12/2013 | ........... E01D 19/125 |
| KR | 2018119968 A | * | 11/2018 | ............ E01D 11/00 |

\* cited by examiner

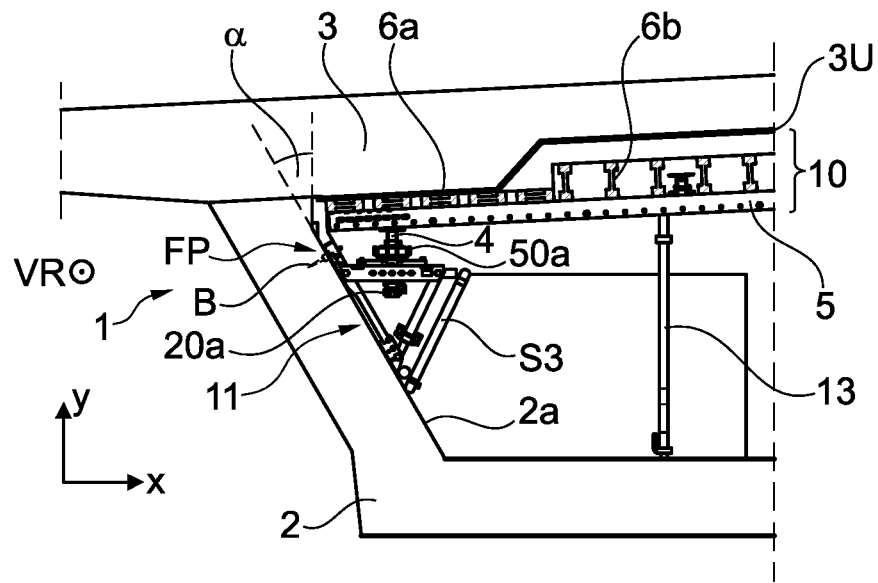
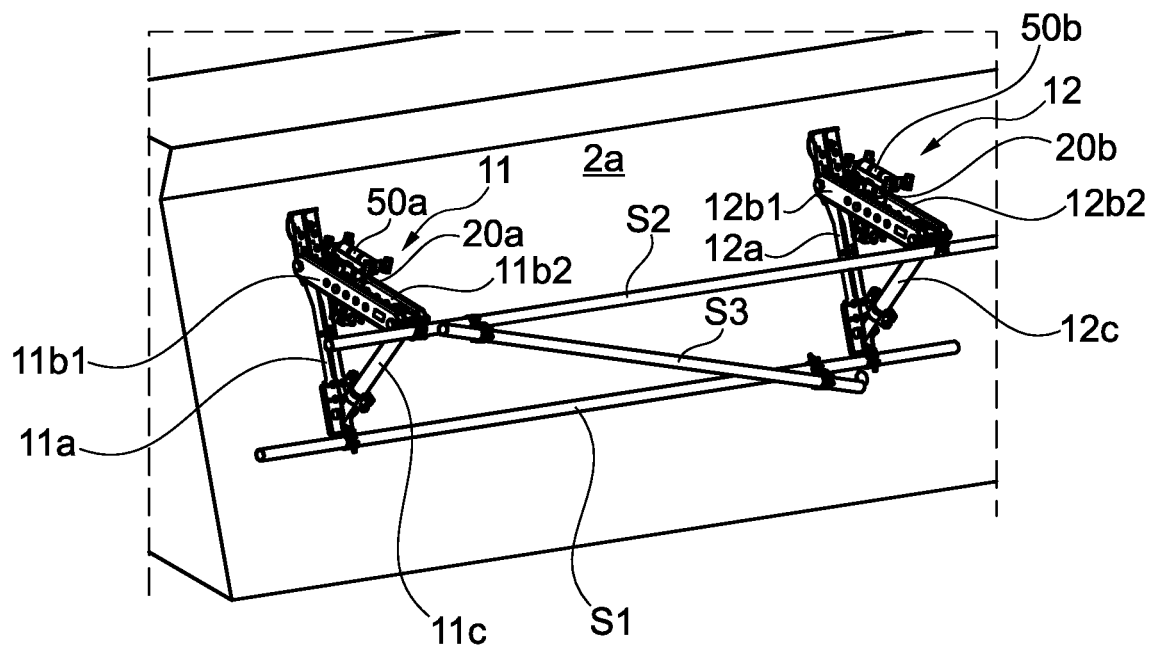
Fig. 1a
Fig. 1b ically inter
SUPPORTING DEVICE FOR THE CONSTRUCTION INDUSTRY, ARRANGEMENT CONSISTING OF AT LEAST TWO SUCH SUPPORTING DEVICES, INCREMENTAL LAUNCHING DEVICE COMPRISING AT LEAST ONE SUCH SUPPORTING DEVICE, AND METHOD FOR SUPPORTING A LOAD ELEMENT USING SUCH A SUPPORTING DEVICE

FIELD OF THE INVENTION

The invention relates to a supporting device for the construction industry, which comprises a fixing element designed to rest against a side wall, in particular a concrete side wall, and to be fixed to a fixing point, in particular an anchoring point, of the side wall, and a cantilever, which is connected to the fixing element. Furthermore, the invention relates to an arrangement consisting of at least two supporting devices of this type arranged next to one another in a movement direction of a load element, to an incremental launching device having at least one such supporting device or at least one arrangement consisting of two such supporting devices, and to a method for supporting the load element in the construction industry by means of such a supporting device.

BACKGROUND OF THE INVENTION

In the incremental launching method, which is used in bridge construction, for example, amongst other things slab formwork is passed or moved from a previous concreting phase to a subsequent concreting phase. Slab formwork that is present is stripped for this purpose, i.e. lowered from a concreting level that is required for concreting, passed or moved horizontally into the next concreting phase and then pushed upwards or raised to the concreting level required and constructed. The movement of the slab formwork is known to be carried out by means of supporting devices mounted on a concrete side wall in the form of deck slab brackets.

The deck slab bracket is mounted on an anchoring point in the concrete side wall and comprises a triangular structure having rotatably interconnected carrier elements. When the slab formwork bears against the deck slab bracket during movement, a movement force component acts on the deck slab bracket in the movement direction of the slab formwork as a result of friction between the slab formwork and the deck slab bracket, which component leads to a torque on the deck slab bracket. This torque can cause the deck slab bracket to rotate relative to the side wall, which can result in the deck slab bracket folding away or pivoting about the anchoring point, which can cause complete failure of the folded-away or pivoted deck slab bracket and must be avoided at all costs.

In the prior art, the deck slab bracket is prevented from folding away or pivoting when the slab formwork moves by adjoining deck slab brackets being interconnected by longitudinal struts, which are arranged in parallel with one another and are provided with a transverse strut for additional reinforcement. The work effort for mounting and removing the struts forming a scaffolding tube assembly is, however, considerable. During the incremental launching method in particular, it is complex to mount or remove the scaffolding tube assembly when the brackets are shifted into the next concreting phase and requires considerable operating time and costs.

SUMMARY OF THE INVENTION

In contrast, the object of the present invention is to provide a supporting device for the construction industry, by means of which the effort for mounting or removing a scaffolding tube assembly can be reduced or avoided while avoiding the disadvantage of the prior art that has been described, and therefore a construction process can be simplified and sped up. In addition, the supporting device is intended to be cost-neutral compared with a conventional supporting device including the scaffolding tube assembly, and is intended to be just as effective at preventing the supporting device from folding away or pivoting about the anchoring point under load.

This object is achieved according to the invention by a supporting device for the construction industry, by an arrangement consisting of at least two such supporting devices arranged next to one another in a movement direction of a load, to an incremental launching device having at least one such supporting device or at least one arrangement consisting of two such supporting devices, and to a method for supporting the load element in the construction industry by means of such a supporting device.

The object of the invention is therefore achieved by a supporting device for the construction industry, comprising a fixing element, which is designed to rest against a side wall, in particular a concrete side wall, and to be fixed to a fixing point, in particular an anchoring point, of the side wall, comprising a cantilever, which is connected to the fixing element and protrudes from the side wall when the fixing element is in the fixed state such that a load element can bear against a bearing point of a bearing element of the cantilever, whereby the load element can move with respect to the cantilever in a movement direction that is substantially parallel to the side wall, and which cantilever, when the load element bears against the bearing element of the cantilever, is coupled to the load element such that a movement force component acts on the cantilever in the movement direction due to a movement of the load element, which component leads to a torque on the cantilever by means of a lever arm that reaches from the fixing point to the bearing point, and comprising at least one rotation-reducing element, which is connected by one end to the cantilever and is designed to rest against the side wall by means of a different end when the load element, which bears against the cantilever, moves, in order to counteract the torque on the cantilever. At least one rotation-reducing element therefore protrudes from the cantilever in the direction of the side wall such that, when the load element moves, the end of the rotation-reducing element facing the side wall is pressed against the side wall, reducing the torque effectively acting on the cantilever.

The supporting device can be formed as a bracket, in particular a deck slab bracket, which can be used on a side wall of a bridge trough during the incremental launching method in order to support slab framework in the form of a load element. If the rotational rotation-reducing element comprises a flange for producing the connection with the cantilever at one end, which can be flange-mounted on a known cantilever, it is possible to convert a known supporting device, for example a deck slab bracket in the form of a triangular steel structure, into the supporting device according to the invention by attaching the rotation-reducing element. One end and/or the other end of the rotation-reducing element can each be formed as an end portion or end region having a spatial extent. If the supporting device is formed as a bracket, instead of scaffolding tubes on opposite sides of the bracket cantilever, for example on the side wall on the left- and right-hand side of the bracket cantilever when the fixing element is in the fixed state, two tubular profiles in the form of rotation-reducing elements can be fixed in and counter to the movement direction, which rotation-reducing elements pull directly on the side wall that is made of concrete, for example. The cantilever can be oriented substantially perpendicularly to the movement direction in one plane such that the rotation-reducing element stops the cantilever from losing its orientation and therefore its supporting function when the load element moves.

During the incremental launching method in particular, due to the rotation-reducing element included in the supporting device formed as a bracket, the complex process of mounting or removing a scaffolding tube assembly when shifting the slab into the next concreting phase is omitted. As a result, the construction process is sped up and the brackets according to the invention are easier to shift without the additional complexity of removing and mounting the scaffolding tube assembly. The invention also allows for a cost-neutral solution compared with a conventional supporting device including the scaffolding tube assembly while being just as effective at preventing the supporting device from folding away or pivoting about the fixing or anchoring point under load, since the rotation-reducing element, when designed as a tubular profile, can be no more expensive or even cheaper to produce than a scaffolding tube assembly consisting of two longitudinal struts and a transverse strut including clamps for producing the connection with the known supporting devices/brackets. This is still true if two rotation-reducing elements in the form of support wings are mounted on two supporting devices in and counter to the movement direction in each case.

The supporting device can already be pretensioned relative to the side wall without load such that the rotation-reducing element always rests against the side wall, or is only pressed against the side wall under load during a movement of the load element, for example slab formwork. In the latter case, the other end of the rotation-reducing element protrudes from the side wall by a distance that can be approximately 1 cm, a few millimeters, approximately one millimeter or less, for example, when the fixing element is in the fixed state without the load element that moves with respect to the supporting device. The other end of the rotation-reducing element can, but does not have to, be arranged in a horizontal plane of the bearing element. The rotation-reducing element can also have the shape of an elongate wing, an arch shape or other curved shape also being possible, for example a J or S shape.

According to the invention, the rotation-reducing element is connected to the cantilever and not to the fixing element, which rests against the side wall, in the fixed state. In this way, the connection between the fixing element and the cantilever, which can be rotatable, cannot lead to a reduction in the action of the rotation-reducing element in the opposite direction to the torque on the cantilever. Instead, the rotation-reducing element accurately engages on the cantilever of the supporting device, into which the torque is introduced by the lever arm from the fixing point to the bearing point.

The rotation-reducing element advantageously has a length from one end to the other end that is at least sufficient to prevent the cantilever from rotating due to the torque on the cantilever such that the cantilever cannot fold or pivot away around the fixing point. A rotational movement of the cantilever due to the torque acting on the cantilever is therefore not ruled out. When the rotation-reducing element is resting against the side wall, the rotational movement must only be stopped or prevented by the rotation-reducing element if the folding or pivoting away of the cantilever around the fixing point may impair the supporting function of the supporting device, i.e. the load to be supported and the load position. For example, the length can approximately equal the distance of one end of the cantilever that faces away from the side wall to the side wall. The length of the rotation-reducing element can also be approximately half the length of the fixing element. Other dimensions are possible.

In an advantageous embodiment, the rotation-reducing element comprises a length from one end to the other end that is sufficient for preventing the cantilever from rotating due to the torque on the cantilever such that the cantilever cannot fold or pivot away about a first pivot axis, which is perpendicular to the side wall and comprises the fixing point and/or about a second pivot axis, which lies in a plane of the side wall and comprises the fixing point. The first and second pivot axes are the most common axes about which the cantilever folds or pivots away so as to reduce the supporting function of the supporting device.

When the rotation-reducing element is designed as a support wing having an elongate shape in the form of a solid body or hollow body, in particular having a tubular profile, the rotation-reducing element can be produced particularly simply and inexpensively. When designed as a hollow body, in particular a tubular profile, the rotation-reducing element also weighs less than when it is designed as a solid body.

When the fixing element is in the fixed state, the rotation-reducing element advantageously substantially extends in the movement direction away from the cantilever and/or another rotation-reducing element extends away from the cantilever in the direction that is substantially opposite the movement direction. The counter-torque by means of a lever arm, which is attached to the bearing point of the other end of the rotation-reducing element and has a length from one end to the other end, can be achieved by a compact and simple rotation-reducing element in this case. The rotation-reducing element can particularly effectively counteract the torque with the movement force component of the load element in the movement direction if the supporting device has three bearing points, comprising two different ends of the rotation-reducing element and the additional rotation-reducing element and the fixing point on the side wall. When both the rotation-reducing element and the additional rotation-reducing element are connected to the cantilever, a modification to the supporting connection by attaching the additional rotation-reducing element can also be dispensed with if the load element is moved counter to the movement direction.

When the fixing element is in the fixed state, one end of the rotation-reducing element/additional rotation-reducing element is advantageously connected to an end portion of the cantilever, in particular of the bearing element of the cantilever, which faces the side wall in order to maintain access to a lowering device connected to the cantilever when the fixing element is in the fixed state.

When the fixing element is in the fixed state, the rotation-reducing element/additional rotation-reducing element advantageously comprises a recess on a side of the rotation-reducing element/additional rotation-reducing element that faces the side wall such that a wedge, in particular a wooden wedge, can be arranged between the rotation-reducing element/additional rotation-reducing element and the side wall so as to be guided by the recess, at least in part, such that, when the fixing element is in the fixed state, the wedge is pressed against the side wall in order to brace the supporting device so as to increase the rigidity of the supporting device. The fixing element, also called a wall shoe, rests completely against the concrete side wall by means of its bearing surface, for example. When the rotation-reducing elements in the form of support wings oriented in and counter to the movement direction are not touching the concrete and are pretensioned when the side wall is flat, the wedges can be placed in the recesses in each support wing and driven in between the side wall and the support wing in order to achieve the desired degree of pretension of the supporting device.

If the other end of the rotation-reducing element/additional rotation-reducing element protrudes relative to a side of the fixing element that faces the side wall in the direction of the side wall by means of a protrusion in a plane that is perpendicular to the movement direction such that, when the fixing element is in the fixed state, the protrusion is pressed against the side wall and the supporting device is braced in order to increase the rigidity of the supporting device, the rigidity of the supporting device is increased when the load element moves in comparison with a non-braced supporting device. The fixing element fully rests against the concrete side wall by means of its bearing surface, for example, and the rotation-reducing elements in the form of support wings oriented in and counter to the movement direction touch the concrete and are pretensioned when the side wall is planar.

When the fixing element is in the fixed state, the bearing element of the cantilever is advantageously connected to the fixing element so as to be rotatable around a substantially horizontal first rotary shaft that extends substantially in parallel with the side wall. At different positive or negative inclination angles of the side wall with respect to the vertical, i.e. side walls with no overhang (positive inclination angle), side walls oriented perpendicularly to the ground (inclination angle with respect to the vertical substantially zero degrees) or side walls with an overhang (negative inclination angle), the bearing element can then always be oriented substantially horizontally, i.e. for example in an angular range of +/−10° about the horizontal, in order to attach a roller to the bearing element, for example, which reduces a frictional force between the bearing element and the load element when the load element moves. Lower friction leads to a lower torque together with the movement force component on the cantilever. The low torque means the rotation-reducing element can be smaller and/or less rigid, which reduces the costs for producing the rotation-reducing element.

The other end of the rotation-reducing element/additional rotation-reducing element is particularly advantageously formed by a bearing element having a bearing surface that faces the side wall when the fixing element is in the fixed state, whereby the bearing surface is curved concentrically with the first rotary shaft of the bearing element of the cantilever in the direction of the side wall in a plane that is perpendicular to the movement direction such that, when the bearing element of the cantilever is oriented horizontally and at different positive or negative inclination angles of the side wall with respect to the vertical, the side wall forms a tangent on the bearing surface that faces the side wall in a plane that is perpendicular to the movement direction. The bearing surface of the rotation-reducing elements formed as support wings, for example, which are bent in this way concentrically to the rotary shaft of the bracket cantilever relative to the fixing element, allows for secure resting against the side wall irrespective of the set inclination angle of the bearing element with respect to the fixing element in order to substantially horizontally orientate the bearing element, i.e. for example in an angular range of +/−10° about the horizontal. If a plurality of supporting devices are arranged in an assembly next to one another in the movement direction and are interconnected, the action of the assembly that is independent of the inclination of the side wall can be achieved by the curvature according to the invention of the bearing surface or bearing contour of the rotation-reducing elements formed as support wings, for example, wherein individual brackets can be readjusted despite being effectively supported by means of the connection with an adjacent individual bracket. The brackets can therefore be shifted despite the connection, for example to a scaffolding tube. However, the brackets can only be shifted to a small extent, since a clamp for fixing the scaffolding tube, for example, in order to produce the connection between adjacent individual brackets is fixedly/rigidly welded to each of the brackets.

The adhesive action of the rotation-reducing element relative to the side wall is improved if the bearing surface is serrated, in particular with teeth extending in the movement direction and oriented in the direction of the side wall when the load element bearing against the cantilever moves, whereby the teeth are in particular designed to act as spikes when they rest against the side wall. When the protrusion is formed by the teeth, i.e. the serrated surface of the bearing surface is oversized, the rotation-reducing elements formed as support wings are reliably braced when the supporting device is mounted to the concrete wall.

When the fixing element is in the fixed state, the bearing element is advantageously connected to the cantilever so as to be horizontally moveable in a plane that is perpendicular to the movement direction. Such a connection allows the distance between the bearing element and the side wall or the degree to which the supporting device is braced to be adapted when the resting element rests against the side wall without a load being moved when the fixing element is in the fixed state, i.e. also during constant use of the supporting device.

In addition to the resting element, the cantilever can comprise a first support element, whereby the bearing element is connected at one end to the fixing element so as to be rotatable around the first rotary shaft and is connected at the other end to the first support element so as to be rotatable around a substantially horizontal second rotary shaft that extends substantially in parallel with the side wall when the fixing element is in the fixed state, the end of which that faces the side wall being connected to the fixing element so as to be rotatable around a substantially horizontal third rotary shaft, which extends substantially in parallel with the side wall, when the fixing element is in the fixed state. The gravitational force of the load element applied to the cantilever can therefore be passed from the cantilever into the side wall by means of the first support element not only at the fixing point but also at a second force-introduction point on the side wall. Such a supporting device can be triangular when viewed from the side and made of steel.

In the event that the supporting device has a different shape, the bearing element can be connected at the other end to a second support element so as to be rotatable around the second rotary shaft, which is substantially horizontal and extends substantially in parallel with the side wall when the fixing element is in the fixed state, the end of which support element that faces away from the bearing element being connected to the first support element by an additional rotary shaft that is substantially horizontal and extends substantially in parallel with the side wall, wherein in particular a third support element is connected at one end to the end of the second support element facing away from the bearing element and at the other end to the first rotary shaft. When the fixing element is in the fixed state, by means of the third support element that is formed as a strut, for example, a rotational movement of the first support element and/or of the second support element around the additional rotary shaft is prevented. The bearing element, the second support element and the third support element therefore form a rigid arrangement, wherein the substantially horizontal orientation of the bearing element can then be adjusted over a length of the first support element. This supporting device, which can be rectangular when viewed from the side and can be made of steel, is in particular used for a side wall having a negative inclination angle with respect to the vertical, i.e. an overhanging side wall.

If the first support element is formed as a telescope, in particular in the form of a spindle or a lifting device such that, at different positive or negative inclination angles of the side wall, a substantially horizontal orientation, for example in an angular range of +/−10° about the horizontal, of the bearing element of the cantilever is ensured, the supporting device can be used flexibly at different inclination angles of the side wall with respect to the vertical.

The invention also includes an arrangement consisting of at least two supporting devices according to the invention that are arranged next to one another in the movement direction, in particular at least two supporting devices arranged next to one another in the movement direction, each comprising the second and third support element, when the fixing element is fixed to the fixing point of the side wall that has a negative inclination angle with respect to the vertical, whereby the supporting devices are each formed as deck slab brackets, one supporting device comprising a/the rotation-reducing element that extends away from the cantilever substantially in the movement direction when the fixing element is in the fixed state, the other supporting device comprising an additional/the additional rotation-reducing element that extends away from the cantilever in the direction that is substantially opposite the movement direction when the fixing element is in the fixed state, and the supporting devices are interconnected by at least one longitudinal strut. This arrangement allows for the torque to be introduced into the other supporting device together with the movement force component on the cantilever of one of the supporting devices such that the rotation-reducing element of one supporting device that extends away from the cantilever in the movement direction and the rotation-reducing element that extends away from the cantilever of the other supporting device in the direction counter to the movement direction interact for both supporting devices. A conventional supporting device that does not comprise a rotation-reducing element can also be connected to the supporting device according to the invention, for example by a longitudinal strut, wherein the rotation-reducing element also counteracts a torque acting on the cantilever of the conventional supporting device under load.

In one embodiment of the invention, an incremental launching device comprises at least one supporting device according to the invention or at least one arrangement consisting of two supporting devices according to the invention and slab formwork having a formwork shell carrier element, which is designed to shape an underside of a deck slab, wherein the supporting device is formed as a deck slab bracket and comprises a support head at an end that faces the slab formwork, wherein the support head is connected to the bearing element of the cantilever and comprises a roller for resting against a longitudinal carrier of the slab formwork. While preventing the described disadvantage of the prior art, this incremental launching device makes it possible to reduce or avoid the effort of mounting or removing a scaffolding tube assembly and therefore to simplify and accelerate the construction process.

The incremental launching device is advantageously designed such that the cantilever is provided with a lowering apparatus having a reciprocating piston, a support base and with a locking device, wherein the reciprocating piston is movably mounted in the support base and can be moved into a formwork-removal position from a formwork-erection position and can be locked in the pushed-out operating position by means of the locking device, wherein the locking device is provided with a rotary bearing and a cam lever, wherein the cam lever is rotatably fastened in the rotary bearing and the reciprocating piston and the support base are supported against one another in the operating position (see above) by means of the cam lever, and the support base and/or the reciprocating piston form the support head at one end. This guarantees simple and reliable lifting to a concreting level and lowering relative to the concreting level in order to reach and maintain a formwork-erection and formwork-removal position for the supporting device under load.

The invention also comprises a method for supporting a load element, in particular slab formwork during the incremental launching method, in the construction industry by means of a supporting device having a fixing element, a cantilever and at least one rotation-reducing element, in which the fixing element is rested against a side wall, in particular a concrete side wall, and the fixing element is fixed to a fixing point, in particular an anchoring point, of the side wall, the cantilever is connected to the fixing element, the cantilever is arranged protruding from the side wall, the load element is positioned against a bearing point of a bearing element of the cantilever, the load element is moved with respect to the cantilever in a movement direction that is substantially parallel to the side wall, the cantilever is coupled to the load element such that a movement force component acts on the cantilever in the movement direction due to a movement of the load element, which component leads to a torque on the cantilever by means of a lever arm that reaches from the fixing point to the bearing point, one end of the rotation-reducing element is connected to the cantilever and another end of the rotation-reducing element is rested against the side wall in order to counteract the torque on the cantilever. The advantages of this method according to the invention correspond to those that have already been mentioned in connection with the supporting device according to the invention.

If the rotation-reducing element extending away from the cantilever substantially in the movement direction and/or another rotation-reducing element extending away from the cantilever in the direction that is substantially opposite the movement direction is/are connected to the cantilever, the other end of each of the rotation-reducing element and/or of the additional rotation-reducing element is formed protruding relative to a side of the fixing element that faces the side wall in the direction of the side wall by a protrusion in a plane that is perpendicular to the movement direction, the fixing element is fixed and the protrusion(s) is/are pressed against the side wall, the supporting device is braced in order to increase the rigidity of the supporting device. In this way, the rigidity of the supporting device is increased with respect to a non-braced supporting device when the load element moves.

If the rotation-reducing element/additional rotation-reducing element is provided with a recess on a side of the rotation-reducing element/additional rotation-reducing element that faces the side wall, a wedge, in particular a wooden wedge, is arranged between the rotation-reducing element/additional rotation-reducing element and the side wall so as to be guided by the recess, at least in part, and the wedge is pressed against the side wall, the supporting device is braced in order to increase the rigidity of the supporting device. The supporting device can therefore be braced by introducing the wedge between the rotation-reducing element and the side wall and guiding it through the recess alternatively or in addition to the above-described protrusion.

Additional features and advantages of the invention can be found from the following detailed description of one embodiment of the invention, from the claims and on the basis of the figures in the drawings, which show details essential to the invention. The features shown in the drawings are depicted such that the specific features according to the invention can be made clearly visible. In variants of the invention, the different features can be implemented on their own or together in any combinations.

BRIEF DESCRIPTION OF THE DRAWINGS

In the figures, the same reference numerals denote the same or corresponding elements, in which:

FIG. 1a is a lateral view of part of an incremental launching device comprising slab formwork arranged beneath a deck slab, a prop and a supporting device according to a variant that is not claimed, which is formed as a deck slab bracket and is provided with a lowering apparatus, FIG. 1b is a spatial external view of two of the supporting devices shown in FIG. 1 according to a variant that is not claimed, which are formed as deck slab brackets interconnected by longitudinal struts.

DETAILED DESCRIPTION

Figure 2:
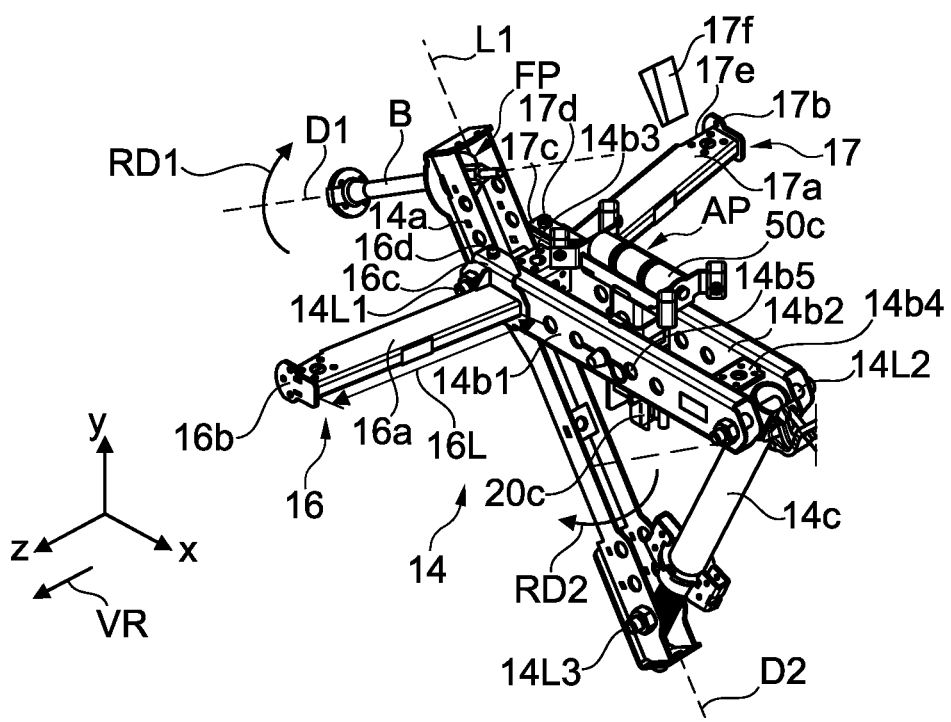
FIG. 2 is a spatial external view of a supporting device according to the invention in a first embodiment, which can be braced by a wedge and comprises a rotation-reducing element that extends away from the cantilever of the supporting device substantially in the movement direction, and another rotation-reducing element, which extends away from the cantilever in the direction that is substantially opposite the movement direction.

FIG. 1a is a lateral view of part of an incremental launching device having slab formwork 10 arranged beneath a deck slab 3, a prop 13 and a supporting device 11 according to a variant that is not claimed, which is formed as a deck slab bracket and is provided with a lowering apparatus 20a. The slab formwork 10 comprises a first longitudinal carrier or first formwork shell carrier element 6a and a second longitudinal carrier or second formwork shell carrier element 6b, which together shape an underside 3U of the deck slab 3. In addition to the first formwork shell carrier element 6a and the second formwork shell carrier element 6b, the slab formwork 10 comprises a transverse carrier 5, which the longitudinal carriers lean on, and a longitudinal carrier element 4, on which the transverse carrier 5 is arranged. The deck slab 3 of a bridge 1 to be erected leans on a trough 2 by means of a side wall 2a that is inclined with respect to the vertical (in the Y direction) at an angle α. On the side wall 2a, a supporting device 11 according to a variant that is not claimed is connected to the side wall 2a by means of a fixing point FP, wherein the fixing point FP is formed by a bolt B that is countersunk into the side wall 2 substantially perpendicularly to the side wall 2a and the end therefore that faces the side wall 2a sticks out from the side wall 2a such that the supporting device 11 can be connected to the end of the bolt B in order to be fixed to the fixing point FP.

The supporting device 11 horizontally (in the X direction) comprises a carrier element, to which a lowering apparatus 20a is connected, wherein a roller 50a is arranged at an end of the lowering device 20a that faces the slab formwork 10 (in the Y direction), on which roller the longitudinal carrier 4 leans. The slab formwork 10 in the form of a load element can move with respect to the supporting device 20 in a movement direction VR (from the sheet level). Reference numeral 10 is used for both the load element and for the slab formwork in the following. Since the deck slab 3 is concrete, the prop 13 beneath the second skin element 6b is removed and the supporting device 20 beneath the first formwork shell carrier element 6a is shifted from a formwork-erection position to a formwork-removal position such that the slab formwork is lowered in the negative Y direction from a concreting level for concreting the underside 3U of the deck slab 3 and moved in the movement direction VR into a subsequent concreting phase. The formwork-erection position and the formwork-removal position of the supporting device 20 is assumed and held by the roller 50a being moved by means of the lowering apparatus 20a.

FIG. 1b shows two supporting devices 11, 12 (not claimed), which are formed as deck slab brackets, according to the supporting device 11 shown in FIG. 1a and are interconnected by longitudinal struts S1, S2. The supporting device 11 comprises a first carrier element 11a attached to the side wall 2a. At an upper end of the first carrier element 11a beneath the fixing point FP, two carrier elements 11b1, 11b2 are connected to the first carrier element 11a and oriented horizontally (in the X direction). The lowering apparatus 20a is arranged between the second carrier elements 11b1, 11b2, wherein the roller 50a for supporting the longitudinal carrier 4 of the slab formwork 10 is arranged at an upper end of the lowering apparatus 20a in the Y direction. A third carrier element 11c connects a lower end of the first carrier element 11a to an end of the second carrier elements 11b1, 11b2 that protrudes away from the side wall 2a in each case. The supporting device 11 is oriented in an X/Y plane, whereby, when the slab formwork of the longitudinal carrier 4 moves in the movement direction VR that corresponds to the Z direction, bears against the roller 50a and introduces a movement force component into the supporting device in the movement direction VR, i.e. perpendicularly to the X/Y plane.

The second supporting device 12 according to a variant that is not claimed, which cannot be seen due to the lateral view in FIG. 1a, comprises a first carrier element 12a, second carrier elements 12b1, 12b2 and a third carrier element 12c in accordance with the first supporting device 11, which are interconnected at their ends. An additional lowering apparatus 20b is arranged between the second carrier elements 12b1, 12b2, wherein a second roller 50b is arranged at an upper end of the second lowering apparatus 20b so as to be moveable in the movement direction VR in order to bear the longitudinal carrier 4. In order to increase the stability of the two supporting devices 11, 12 when the slab formwork 10 moves, the ends of the second carrier elements 11b1, 11b2 and 12b1, 12b2 that protrude from the side wall 2a are interconnected by means of the longitudinal struts S2. The lower ends of the first carrier elements 11a, 12a are interconnected by the longitudinal struts S1, wherein the longitudinal struts S1 and S2 are oriented in parallel with one another. In order to further reinforce the arrangement of the two supporting devices 11, 12, a transverse strut S3, which is shown in FIG. 1a, is also connected to both the longitudinal strut S1 and to the longitudinal strut S2 such that the transverse strut S3 is oriented transversely to the longitudinal strut S1 and to the longitudinal strut S2.

FIG. 2 is a spatial external view of a supporting device 14 according to the invention, comprising a rotation-reducing element 16 that extends away from a cantilever 14b1, 14b2, 14c of the supporting device 14 substantially in the movement direction VR and an additional rotation-reducing element 17, which extends away from the cantilever 14b1, 14b2, 14c in the direction that is substantially opposite the movement direction VR, in a first embodiment. The supporting device 14 comprises a fixing element 14a, which rests against the side wall 2a without an overhang, i.e. with a positive inclination angle with respect to the vertical, and is fixed to the fixing point FP, which is defined by the bolt B projecting from the side wall 2a in the form of an anchoring point, so as to rest against the side wall. The supporting device 14 also comprises a cantilever 14b1, 14b2, 14c, which projects from the fixing element, is connected to the fixing element 14a and protrudes from the side wall 2a when the fixing element 14a is in the fixed state such that the slab formwork 10 in the form of a load element can bear against a bearing point AP of a bearing element 14b1, 14b2 of the cantilever 14b1, 14b2, 14c. The load element 10 in the form of the slab formwork can be moved in the movement direction VR, which is oriented substantially in parallel with the side wall 2a, with respect to the cantilever 14b1, 14b2, 14c by means of a lowering apparatus 20c arranged between the bearing struts 14b1, 14b2 of the bearing element and a roller 50c arranged at one end of the lowering apparatus 20c in the Y direction with respect to the cantilever 14b1, 14b2, 14c, and therefore with respect to the supporting device 14. If the slab formwork in the form of a load element 10 bears against the bearing element in the form of the bearing struts 14b1 and 14b2, the cantilever 14b1, 14b2, 14c is coupled to the load element 10 such that a movement force component acts on the cantilever 14b1, 14b2, 14c in the movement direction VR, i.e. in the Z direction, due to a movement of the slab formwork, which component leads to a torque on the cantilever 14b1, 14b2, 14c by means of a lever arm HA that reaches from the fixing point FP to the bearing point AP.

A first pivot axis D1 is defined by a longitudinal axis of the bolt B such that the fixing element 14a is moved around the fixing point FP along the side wall 2a in the direction RD1 if the slab formwork 10 is moved on the roller 50c. It is also possible that, if the dead weight of the slab formwork 10 is of such a size that a rotational movement in the direction RD1 about the fixing point FP is prevented, the cantilever 14b1, 14b2, 14c is rotated about a longitudinal axis L1 of the fixing element 14a as the second pivot axis D2 in the direction RD2 if the slab formwork 10 is moved on the roller 50c. The case may also occur in which, due to the torque on the cantilever 14b1, 14b2, 14c by means of the lever arm that reaches from the fixing point FP to the bearing point AP, both a rotational movement about the first pivot axis D1 in the direction RD1 and a rotational movement about the second pivot axis D2 in the direction RD2 occurs. The bearing struts 14b1 and 14b2 of the bearing element are interconnected by means of spacer elements 14b3 and 14b4 such that between the spacer elements 14b3, 14b4, a lowering apparatus 20c is arranged between the bearing struts 14b1 and 14b2. The lowering apparatus 20c is fixed by a guide bolt, which extends through bolt through-holes 14b5, with respect to the bearing struts 14b1, 14b2, which form the bearing element. The spacer elements 14b3, 14b4 are each located at ends of the bearing element 14b1, 14b2 that face away from the side wall 2a and face the side wall 2a. In the cantilever, a first support element 14c is rotatably connected to the bearing element 14b1, 14b2 by means of a rotary shaft 14L2. The ends of the bearing struts 14b1, 14b2 that face the side wall 2a are connected to the fixing element 14a by means of another rotary shaft 14L1. An end of the first support element 14c that faces the side wall 2a is rotatably connected to the fixing element 14a by means of an additional rotary shaft 14L3. The first to third rotary shafts 14L1, 14L2 and 14L3 are each oriented in the movement direction VR, i.e. the Z direction.

The supporting device 14 further comprises at least one rotation-reducing element 16, 17, which is connected by one end to the cantilever 14b1, 14b2, 14c and is designed to rest against the side wall 2a by a different end when the slab formwork 10 that bears against the cantilever 14b1, 14b2, 14c, more specifically against the roller 50c of the lowering device 20c of the bearing element 14b1, 14b2 of the supporting device 14, moves, in order to counteract the torque exerted on the cantilever 14b1, 14b2, 14c by the moving slab formwork. The rotation-reducing element 16 is formed as a support wing and comprises a support strut 16a, a resting element 16b and a flange 16c. The rotation-reducing element 16 is oriented in the direction that is substantially parallel to the movement direction VR and extends from the bearing strut 14b1 in the direction that is substantially parallel to the movement direction VR away from the bearing strut 14b1. One end of the rotation-reducing element 16 is formed by the flange 16c, which is connected to the bearing element 14b1, 14b2 at the end portion thereof that faces the side wall 2a by means of a connecting means 16d in the form of a screw oriented in the Y direction. The other end of the rotation-reducing element 16 is formed by the bearing element 16b, which, when the load element 10 in the form of the slab formwork that bears against the cantilever 14b1, 14b2, 14c moves, rests against the side wall 2a in order to counteract the torque on the cantilever that is introduced into the cantilever 14b1, 14b2, 14c by the moving slab formwork. The rotation-reducing element 16 comprises a length 16L from one end formed by the flange 16c to the other end formed by the bearing element 16b, which length is sufficient for reducing a rotational movement of the cantilever 14b1, 14b2, 14c due to the torque on the cantilever when the slab formwork moves with respect to the supporting device 14 in the movement direction VR such that the cantilever cannot fold away or pivot around the fixing point FP.

In the direction that is substantially opposite the movement direction VR, another rotation-reducing element 17 extends from the cantilever 14b1, 14b2, 14c having an additional support strut 17a in the form of a support wing, an additional flange 17c and an additional bearing element 17b such that both rotation-reducing elements 16, 17 are oriented axially symmetrically to one another with respect to the longitudinal axis L1 of the fixing element 14a. The flange 17c is connected to the bearing element 14b1, 14b2 at the end portion thereof that faces the side wall 2a by means of an additional connecting means 17d in the form of a screw oriented in the Y direction. The additional rotation-reducing element 17 comprises a recess 17e in the support strut 17a on a side that faces the side wall 2a when the fixing element 14a is in the fixed state (see the removed region up to the dashed line in FIG. 2). The recess 17f, which can adjoin the additional bearing element 17b as shown in FIG. 2, is designed such that a wedge 17f, which can in particular be formed as a wooden wedge, can be arranged between the additional rotation-reducing element 17 and the side wall 2a so as to be guided by the recess 17e, at least in part, so that, when the fixing element 14a is in the fixed state, the wedge 17f is pressed against the side wall 2a in order to brace the supporting device 14 so as to increase the rigidity of the supporting device 14. A length of the recess 17e in a direction that substantially corresponds to the Z direction can at least correspond to a width of the wedge 17f in this direction. A width of the recess 17e in the substantially negative X direction can at least correspond to a depth of a narrow side of the wedge 17f, which is opposite a less narrow side of the wedge 17f. Of course, the first rotation-reducing element can also comprise a corresponding receptacle for a wedge.

Figure 3:
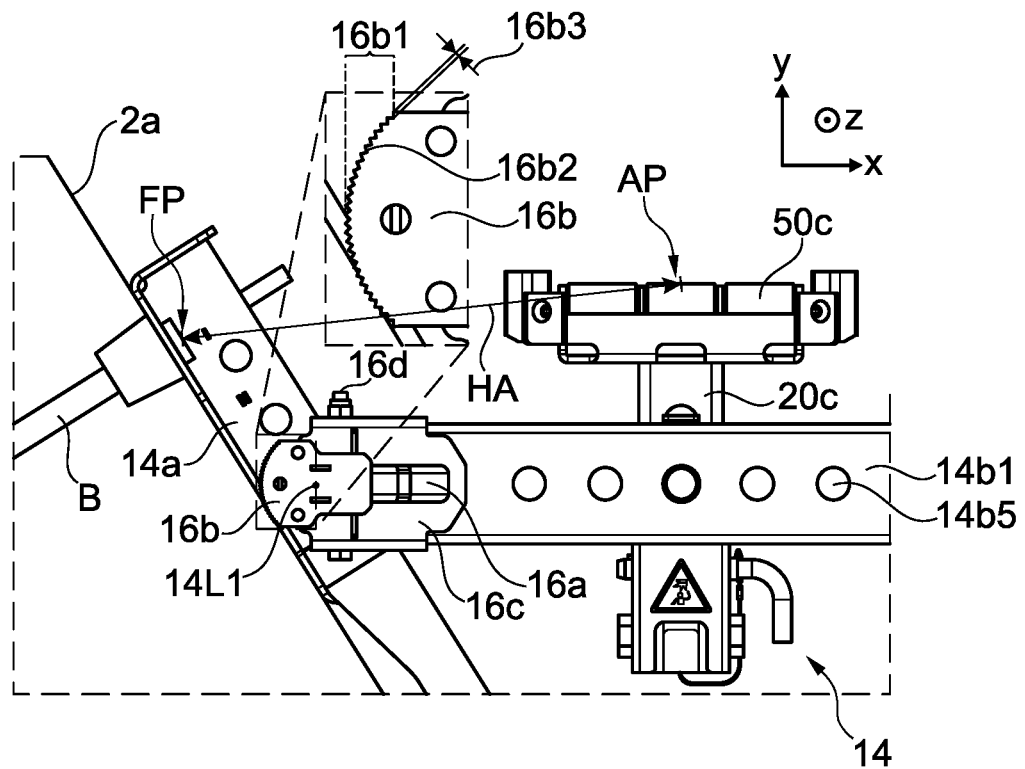
FIG. 3 is a lateral view of a cut-out of the supporting device according to the invention shown in FIG. 2 and a lateral enlarged view of a bearing element of the rotation-reducing element in each case.

FIG. 3 is a lateral view of a cut-out of the supporting device 14 according to the invention shown in FIG. 2 and an enlarged view of the resting element 16b of the rotation-reducing element 16 in each case. The resting element 16b rests against the side wall 2a, wherein the slab formwork 10, more specifically the longitudinal carrier 4 of the slab formwork (not shown), bears against the roller 50c. The resting element 16b is connected to the flange 16c by means of the support strut 16a, which flange is connected to the bearing strut 14b1 of the bearing element that consists of the bearing struts 14b1 and 14b2 by means of the screw connection 16d. During a movement of the slab formwork in the form of the load element 10, the lever arm HA leads from the fixing point FP, which is defined by the bolt B protruding from the side wall 2a, to the bearing point AP on the roller 50c as the center of gravity of the load element when it bears against the cantilever 14b1, 14b2, 14c.

The movement force component of the slab formwork 10 acts on the bearing point AP, which component occurs as a result of a residual friction of the roller 50c with respect to the slab formwork 10 when the slab formwork 10, in the form of the movement force component transferred to the cantilever, moves. This movement force component of the movement force acting on the slab formwork is transferred from the roller 50c and the lowering apparatus 20c as part of the supporting device 14 to the cantilever 14b1, 14b2, 14c. When the lowering apparatus 20c is in a different position to that in FIG. 3, the lever arm HA can be shortened or lengthened using a different bolt through-hole 14b5.

The resting element 16b is curved in the direction of the side wall 2a in the shape of a dome in the X/Y plane as the plane that is perpendicular to the movement direction VR, wherein the curvature has the shape of a circular segment having a center, which extends concentrically to the rotary shaft 14L1, by means of which the bearing element 14b1, 14b2 is connected to the fixing element 14a. FIG. 3 shows the position of the rotary shaft 14L1 as a point roughly in the center of the resting element 16b. By means of the curvature of the bearing surface of the resting element 16b on the side wall 2a when the slab formwork 10 moves with respect to the supporting device 14, in a plane that is perpendicular to the movement direction VR, in the direction of the side wall 2a and concentrically with respect to the first rotary shaft 14L1 of the bearing element 14b1, 14b2 of the cantilever, when the bearing element 14b1, 14b2 is oriented horizontally and at different inclination angles α (see FIG. 1a) of the side wall 2a with respect to the vertical in a plane that is perpendicular to the movement direction VR, the side wall can form a tangent on the bearing surface of the resting element 16b that faces the side wall 2a, as is shown in FIG. 3. In this way, at different inclination angles of the side wall with the bearing element 14b1, 14b2 always being oriented horizontally, the supporting device 14 according to the invention can guarantee a reliable and constant function of the rotation-reducing element 16 in the form of a counteraction of the torque exerted on the cantilever 14b1, 14b2, 14c.

For a high degree of adhesion of the resting element 16b to the side wall 2a during a movement of the slab formwork 10 on the supporting device 14, the bearing surface of the resting element 16b comprises teeth 16b2 on the side wall 2 oriented in the movement direction VR, wherein the teeth 16b2 are designed to act as spikes when they rest against the side wall 2a. The teeth 16b2 are provided in a curved portion 16b1 of the resting element 16b that is shaped as a circular segment. In a plane that is perpendicular to the movement direction VR, a protrusion 16b3 protrudes relative to the side of the fixing element 14a that faces the side wall 2a in the direction of the side wall 2a such that, when the fixing element 14a is in the fixed state, the protrusion 16b3 is pressed against the side wall 2*a* and the supporting device 14 is braced in order to increase the rigidity thereof. The protrusion 16*b*3 is not to be mistaken for the curved portion 16*b*1 provided with teeth 16*b*2, but extends as a region of a curved line from the tips of the teeth 16*b*2, in the direction of the side wall 2*a*, to a curved line, which is parallel to this line, of the grooves of the teeth 16*b*2 in the direction facing away from the side wall 2*a*. Therefore, the enlarged cut-out of the resting element 16*b* only shows the region of the protrusion that terminates in the Y direction and extends with a height of the teeth 16*b*2 over the entire curved portion 16*b*1 of the bearing surface of the resting element 16*b* on the side wall 2*a*. The features of the rotation-reducing element 16 according to the invention that are shown in FIG. 3 are correspondingly applicable to the additional rotation-reducing element 17, as is obvious to a person skilled in the art from FIG. 2 and from a horizontal mirror image of the arrangement shown in FIG. 3.

Figure 4:
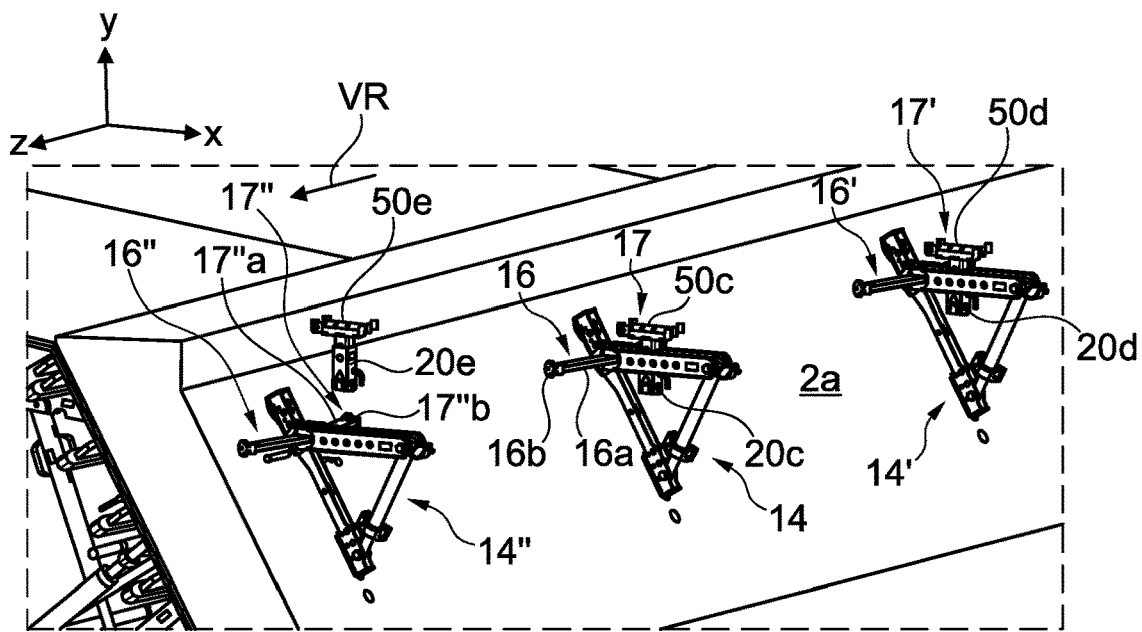
FIG. 4 is a spatial external view of three supporting devices according to the invention next to one another, which are formed as deck slab brackets, according to the supporting device shown in FIG. 2.

FIG. 4 is a spatial external view of three supporting devices 14, 14', 14" according to the invention, which are formed as deck slab brackets, arranged next to one another in the movement direction VR in accordance with the supporting device 14 shown in FIG. 2. The supporting device 14 is shown resting against the fixing point FP on the side wall 2*a* together with the rotation-reducing element 16, which comprises the support struts 16*a* and the bearing element 16*b*. The second rotation-reducing element 17 is covered by the roller 50*c* due to the external view of the lowering apparatus 20*c*. If the lowering apparatus 20*e* together with the roller 50*e* is removed, in addition to the rotation-reducing element 16" in the direction that is substantially parallel to the movement direction VR, the additional rotation-reducing element 17" together with the additional support strut 17"*a* and the additional bearing element 17"*b* can be seen in the supporting device 14", which supporting device is arranged next to the supporting device 14 in the movement direction VR.

Another supporting device 14' comprising the additional rotation-reducing element 16', lowering apparatus 20*d* and roller 50*d* is arranged next to the supporting device 14 in the direction that is opposite the movement direction VR such that, in the movement direction VR, slab formwork 10 having a substantially planar underside in the form of the longitudinal carrier 4 can simultaneously bear against the rollers 50*c*, 50*d* and 50*e* if the slab formwork is moved relative to the supporting devices 14, 14' and 14" in the movement direction VR. Since the rotation-reducing elements 16, 17, 16", 17", 16' counteract the torques that are exerted on the supporting devices 14, 14', 14" in each case due to the movement force component in the movement direction VR when the slab formwork 10 moves on the supporting devices 14 to 14", a connection between these support connections by means of longitudinal/transverse struts S1 to S3 is not required. Instead, the supporting devices 14 to 14" can independently withstand the torque acting thereon when the slab formwork 10 moves, and therefore the longitudinal and transverse struts S1 to S3 shown in FIG. 1*b* can be omitted, which simplifies and speeds up the construction process.

Figure 5:
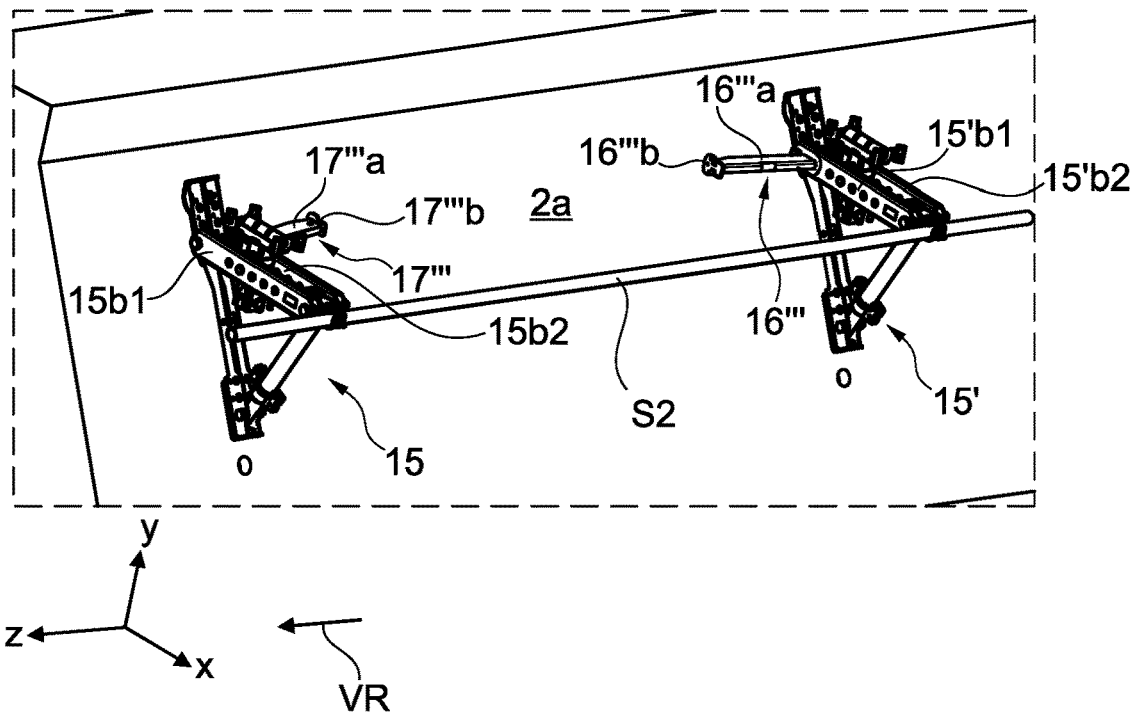
FIG. 5 is a spatial external view of a supporting device according to the invention in a second embodiment, comprising just one rotation-reducing element that extends away from the cantilever of the supporting device substantially in the movement direction and a supporting device according to the invention in a third embodiment, comprising just one rotation-reducing element that extends away from the cantilever in the direction that is substantially opposite the movement direction, whereby the supporting devices are interconnected by a longitudinal strut.

In FIG. 5, an arrangement consisting of two supporting devices 15, 15' according to the invention is shown, which are interconnected by means of the longitudinal strut S2. The supporting device 15 comprises just one rotation-reducing element 17"', which extends away from the cantilever 15b1, 15b2 in the direction that is substantially opposite the movement direction VR, together with the support strut 17'"*a* and the bearing element 17'"*b*. In contrast, the supporting device 15' comprises just one rotation-reducing element 16'", which extends away from the cantilever 15'*b*1, 15'*b*2 substantially in the movement direction VR, together with the support strut 16'"*a* and the bearing element 16'"*b*. In this embodiment, a torque acting on the supporting device 15 is transferred to the supporting device 15' together with a movement force component in the movement direction VR by means of the longitudinal struts S2 such that the rotation-reducing element 16'"*b* counteracts this torque, which not only acts on the supporting device 15' but also on the supporting device 15.

Correspondingly, a torque acting on the supporting device 15' together with a movement force component in the direction that is opposite the movement direction VR is transferred to the supporting device 15 by means of the longitudinal strut S2, whereby the rotation-reducing element 17'" counteracts this torque acting on the supporting device 15'. By means of the connection between the bearing element 15*b*1, 15*b*2 and the longitudinal strut S2 and the connection between the longitudinal strut S2 and the bearing element 15'*b*1, 15'*b*2, a torque acting on the particular supporting device 15 together with a movement force component in or counter to the movement direction VR is transferred to the other supporting device 15, 15' in each case such that such a torque can be counteracted by one or more rotation-reducing elements on one or both of the supporting devices 15, 15'. It is therefore also possible for the supporting device 15 not to comprise a rotation-reducing element and instead for the supporting device 15' to comprise, in addition to the rotation-reducing element 16'" in the direction that is substantially parallel to the movement direction, an additional rotation-reducing element (not shown) in the direction that is substantially opposite the movement direction VR, as is the case in each of the supporting devices 14, 14', 14" shown in FIG. 4. By means of the connection between the two supporting devices 15, 15' by the longitudinal strut S2, when a torque acts on the supporting device 15 together with a force component in or counter to the movement direction VR, this torque can be counteracted by the rotation-reducing element 16'" or the rotation-reducing element 17 in the direction that is opposite the movement direction, and the torque effectively acting on the supporting device 15 can be reduced.

Figure 6A:
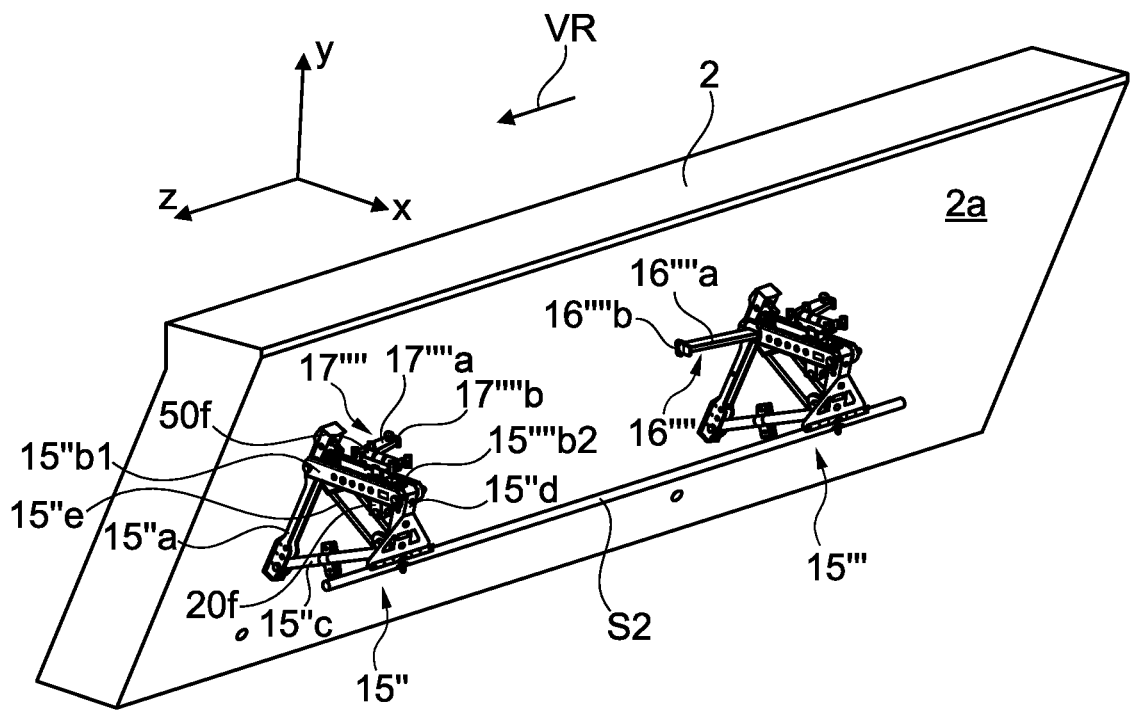
FIG. 6a is a spatial external view of a supporting device according to the invention in a fourth embodiment, comprising just one rotation-reducing element that extends away from the cantilever of the supporting device substantially in the movement direction and a supporting device according to the invention in a fifth embodiment, comprising just one rotation-reducing element that extends away from the cantilever in the direction that is substantially opposite the movement direction, whereby the supporting devices are interconnected by a longitudinal strut.

FIG. 6*a* is a spatial external view of a supporting device 15'" according to the invention according to a fourth embodiment, comprising just one rotation-reducing element 16'"" that extends away from the cantilever of the supporting device 15'" substantially in the movement direction VR and of an additional supporting device 15"" according to the invention according to a fifth embodiment, comprising just one rotation-reducing element 17"" that extends away from the cantilever 15"*b*1, 15"*b*2, 15"*c*, 15"*d*, 15"*e* in the direction that is substantially opposite the movement direction VR. The supporting devices 15" and 15'" are interconnected by a longitudinal strut S2 oriented in the Z direction. The side wall 2*a* of the bridge trough 2 comprises a negative inclination angle with respect to the vertical in the Y direction, wherein the fixing element of the supporting device 15'" and the fixing element 15"*a* of the supporting device 15" are fixed so as to rest against the overhanging side wall 2*a*. The rotation-reducing element 16'"", which is oriented counter to the movement direction VR, of the supporting device 15'" comprises a support strut 16""*a* and a bearing element 16""*b* that rests against the side wall 2*a*.

A bearing element comprising bearing struts 15"*b*1, 15"*b*2 is connected to the fixing element 15"*a* by its end that faces the side wall 2*a* so as to be rotatable around a substantially horizontal rotary shaft that extends substantially in parallel with the side wall 2a. An end of the bearing element 15"b1, 15"b2 that faces away from the side wall 2a is connected to a second support element 15"d so as to be rotatable around a substantially horizontal additional rotary shaft that extends substantially in parallel with the side wall 2a. An end of the second support element 15"d that faces away from the bearing element 15"b1, 15"b2 is connected to a first support element 15"c by means of a substantially horizontal additional rotary shaft that extends substantially in parallel with the side wall 2a. A third support element 15"e in the form of a strut is connected at one end to the end of the second support element 15"d that faces away from the bearing element 15"b1, 15"b2 and at the other end to the rotary shaft in order to connect the fixing element 15"a to the bearing element 15"b1, 15"b2. The rotation-reducing element 17"" of the supporting device 15" oriented counter to the movement direction VR comprises a support strut 17""a and a resting element 17""b, which rests against the side wall 2a. The fixing element 15"a fully rests against the side wall 2a, which is made of concrete in FIG. 6a, by its resting surface but can also be made of a different material. Likewise, the fixing element of the supporting device 15"' fully rests against the side wall 2a by its resting surface. The rotation-reducing elements 16"" and 17"" formed as support wings rest against the planar overhanging side wall 2a in each case and the supporting devices 15" and 15"' are interconnected by means of the longitudinal strut S2 such that the rotation-reducing element 16"" and 17"" are pressed against the overhanging side wall 2a and the supporting devices 15" and 15"' are pretensioned as a result. In the pretensioned state, the supporting device 15" exerts a tensile force on the longitudinal strut S2 in the Z direction and the supporting device 15"' exerts a different tensile force that is the same size as the tensile force on the longitudinal strut S2 in the negative Z direction such that the longitudinal strut S2, which can be formed as a scaffolding tube, is under tension. A lowering apparatus 20f is arranged between the bearing struts 15"b1 and 15^b2, on the support head of which a roller 50f is arranged having a rolling direction in the movement direction VR.

Figure 6B:
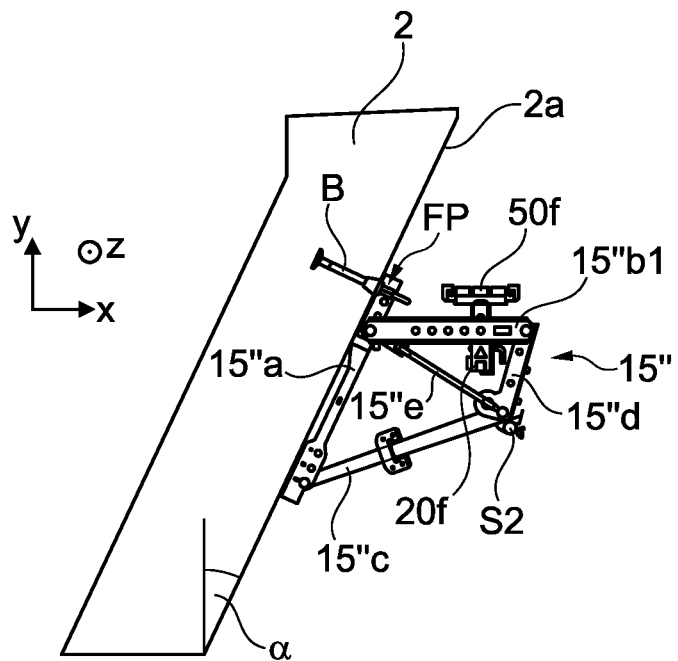
FIG. 6b is a lateral view of the supporting device according to the invention shown in FIG. 6a in the fifth embodiment.

FIG. 6b is a lateral view of the supporting device 15" according to the invention shown in FIG. 6a. The inclination angle α assumes negative values, as a comparison with FIG. 1a shows, in which the inclination angle α is positive. The side wall 2a shown in FIG. 6b therefore overhangs. The fixing element 15"a is fixed to the side wall at the fixing point FP that is defined by a position of the bolt B in the side wall 2a and rests against the side wall 2a by means of end portions in the Y direction and in the negative Y direction. The rotation-reducing element 17"" is covered by the bearing strut 15"b1 of the bearing element 15"b1, 15"b2 and is therefore not visible in FIG. 6b. Due to the overhang of the side wall 2a, the lowering apparatus 20f is guided by the outermost bolt through-hole in the X direction such that slab formwork that bears against the roller 5f and is moved in the Z direction does not touch the side wall 2a. The second support element 15"d is used as an extension of the bearing element 15"b1, 15"b2 such that the first support element 15"c can correspond to the support element 14c shown in FIG. 2 that is included in the supporting device 14, which rests against a side wall 2a with no overhang. The bearing element 15"b1, 15"b2, the second support element 15"d and the third support element 15"e form a rigid arrangement, wherein the substantially horizontal orientation of the bearing element 15"b1, 15"b2 can be adjusted over a length of the first support element 15"c.

Figures 7A, 7B:
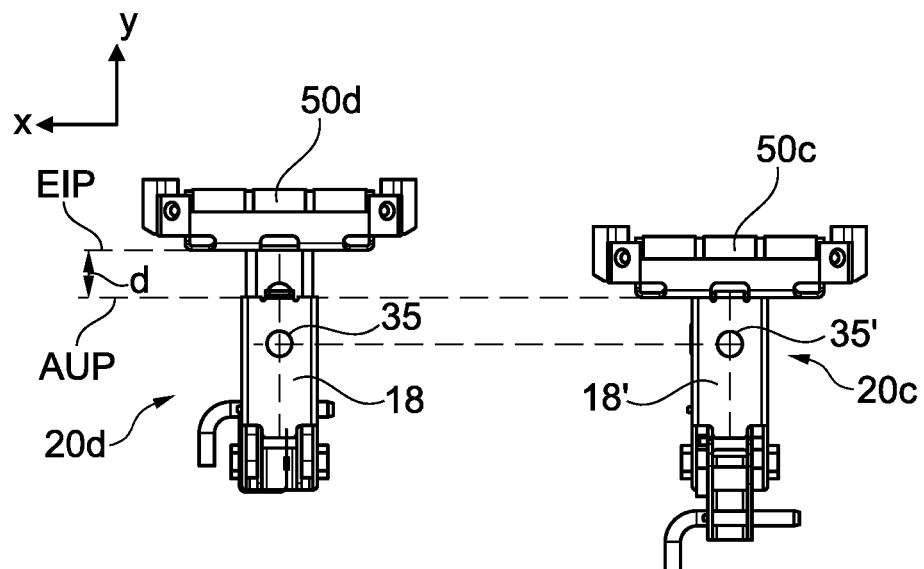
FIG. 7 shows the lowering apparatuses shown in FIG. 4 comprising a support head that is raised to the concreting level and a support head that is lowered relative to the concreting level in each case as per a formwork-erection and formwork-removal position of the supporting device according to the invention that is provided with the particular lowering device.

In FIG. 7, the lowering apparatuses 20c, 20d shown in FIG. 4 are each shown in the formwork-erection position EIP, in which a support head of the lowering apparatus 20d is raised to a concreting level, and in the formwork-removal position AUP, in which a support head of the lowering apparatus 20c is lowered relative to the concreting level, in accordance with the formwork-erection position EIP and the formwork-removal position AUP of the supporting device 14, 14' that is provided with the particular lowering apparatus 20c, 20d. The lowering apparatus 20c and the additional lowering apparatus 20d each comprise a support base 18, which are arranged at the same height in the Y direction. This is depicted by adjustment holes 35 in each of the support bases 18 of the lowering apparatuses 20c, 20d by a horizontal dashed line, which interconnects the two adjustment holes 35.

A reciprocating piston 14A is guided in the support base 18 and is extended in the lowering apparatus 20d such that the lowering apparatus 20d and therefore the supporting device 14' each reach the formwork-erection position EIP. A stroke length of the reciprocating piston 14A therefore corresponds to a vertical spacing or vertical distance d between the formwork-removal position AUP and the formwork-erection position EIP in the Y direction. The formwork-removal position AUP is located at the level of an upper end of the support base 18, as is shown in the lowering apparatus 20c. The formwork-erection position EIP is located at the level of an upper end of the reciprocating piston 14A, as is shown in the lowering apparatus 20d. The vertical distance between the formwork-erection position and the formwork-removal position can be 50 mm, for example. If the lowering apparatus 20d is shifted from the formwork-removal position AUP to the formwork-erection position EIP, not only is the upper end of the reciprocating piston 14A raised by the vertical distance d between the formwork-removal position AUP and the formwork-erection position EIP, but also the roller 50d arranged on the reciprocating piston 14A. By shifting the roller 50d from the formwork-removal position AUP to the formwork-erection position EIP, the slab formwork 10 that moveably bears against the roller 50d can be raised to the concreting level.

Figure 8:
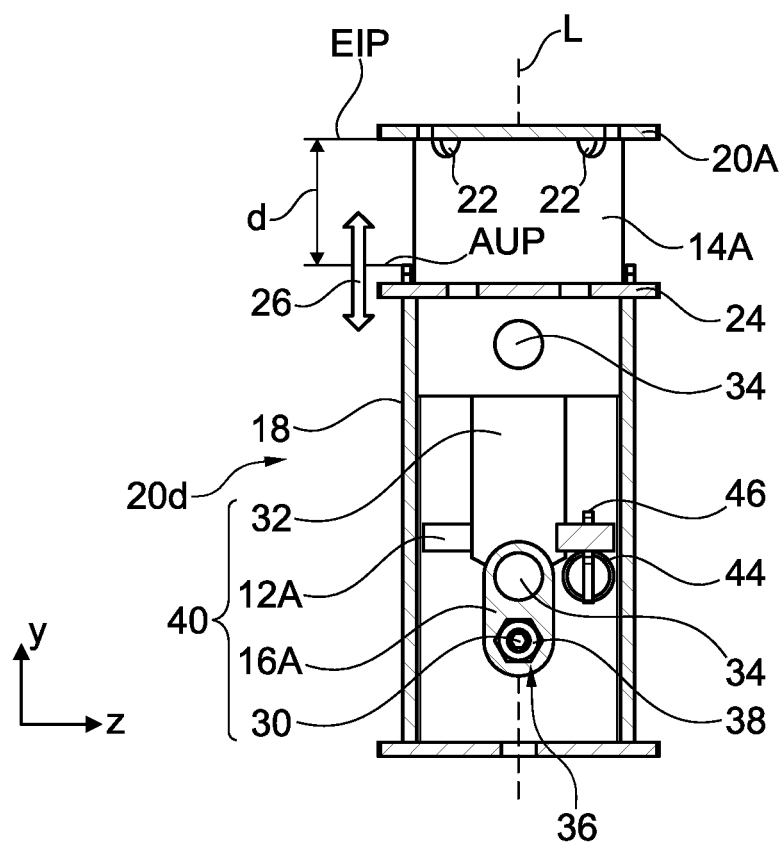
FIG. 8 is a cross-sectional view from the front of one of the two lowering apparatuses shown in FIG. 3b not comprising a roller and comprising a slide as the cam lever retaining device, wherein a reciprocating piston is shown in the extended formwork-erection position.

FIG. 8 is a cross-sectional view from the front of one of the lowering apparatuses 20d shown in FIG. 7 not comprising a roller and comprising a slide 12A as a cam lever retaining device, wherein the reciprocating piston 14A is in the extended formwork-erection position EIP. The lowering apparatus 20d comprises a longitudinal axis, denoted by L, the reciprocating piston 14A and a cam lever 16A. The cam lever 14A is arranged in the formwork-erection position EIP, as in the lowering apparatus 20d in FIG. 7, which is moved to the formwork-removal position AUP by the vertical distance d in the Y direction. The support base 18 can be formed as a housing that protectively surrounds a mechanism of a locking device, for example of the cam lever 16A.

Both the support base 18 and the reciprocating piston 14A comprise a cover plate at their free ends, from which a support head 20A is formed in each case. At the end of the support base 18 on the reciprocating-piston side, stop knobs 22 can be arranged between the support base 18 and the support head 20A of the reciprocating piston 14A. The stop knobs 22 can in this case be welded to an end plate 24 of the support base 18, for example. The end plate 24 comprises an opening (not shown), which shapes the circumferential shape of the cross section of the reciprocating piston 14A, through which opening the reciprocating piston 14A is pushed. The cross-sectional shape of the reciprocating piston 14A can, for example, be circular. However, embodiments having a different cross-sectional shape can also be used, in particular polygonal, preferably rectangular. The direction of the moveable bearing of the reciprocating piston 14A in the support base 18 is shown symbolically by a double-headed arrow 26.

The reciprocating piston 14A can be moved from its pushed-out operating position shown here as the formwork-erection position EIP into the lowered position shown in FIG. 7 by the lowering apparatus 20c in the form of the formwork-removal position AUP in a direction that is axial to the longitudinal axis L, and can be locked by means of the locking device, for example the cam lever 16A, in the pushed-out operating position. FIG. 8 shows a lowering apparatus 20d with the reciprocating piston 14A arranged in the operating position i.e. in the position of maximum disengagement from the support base 18 (=pre-stroke position or formwork-erection position). In other words, the lowering apparatus 20 is arranged in its supporting function position. The parts of the locking device, for example the cam lever 16A, are positioned accordingly. The cam lever 16A that is rotatably fastened to the support base 18 in rotary bearings is movably connected to the reciprocating piston 14A by means of a connecting rod element 32. For this purpose, the cam lever 16A and the reciprocating piston 14A each comprise a hole that is used as an additional rotary bearing. In each of its end regions, the connecting rod element 32 comprises a bolt-like rotary shaft 34. The two rotary shafts 34 are each mounted in one of the additional rotary bearings of the cam lever 16 and of the reciprocating piston 14A.

The dead center of the cam lever 16A is arranged outside the rotary shaft of the cam lever 16A, which shaft is formed by a support shaft 30, between the reciprocating piston 14A and the rotary shaft of the cam lever 16A.

A hub 36 of the rotary shaft of the support shaft 30 and therefore of the cam lever 16A and a screw nut 38 for fastening it can be seen in FIG. 4. The reciprocating piston 14A, the connecting rod element 32 and the cam lever 16A are arranged in a similar way to the structure of a reciprocating engine, wherein the connecting rod element 32 and the cam lever 16A form a toggle joint 40, by means of which the reciprocating piston 14A is moveably connected to the support base 18. The reciprocating piston 14A and the support base 18 are supported against one another by means of the cam lever 16A in the operating position shown as the formwork-erection position. In the embodiment of the lowering apparatus 20 shown, this takes place by means of the connection to the connecting rod element 32.

The cam lever retaining device formed by the slide 12A can comprise a return spring 44 (integrated spring return), wherein the slide 12A is fastened to the support base 18 by means of the return spring 44, for example by means of a fastening pin 46. Furthermore, a visual marking can be marked on the slide 12A to differentiate the lowered position as the formwork-removal position AUP from the raised operating position as the formwork-erection position EIP. This visual marking can, for example, consist of a red and a green visual field attached to the free end of the long limb of the slide 12A, wherein, depending on the position of the slide 12A, only the red visual field or the red and the green visual field come to lie outside the housing.

The features of the invention described with reference to the embodiment shown, for example the connection of one end of the rotation-reducing element to an end portion of the bearing element of the cantilever that faces the side wall when the fixing element is in the fixed state, can also be provided in different embodiments of the invention, for example the connection of one end of the additional rotation-reducing element to an end portion of the bearing element of the cantilever that faces away from the side wall when the fixing element is in the fixed state, unless otherwise stated or unless automatically prohibited for technical reasons.

The invention claimed is:

1. A supporting device for the construction industry, comprising:
 a fixing element, designed to rest against a side wall and to be fixed to a fixing point of the side wall;
 a cantilever, which is connected to the fixing element and protrudes from the side wall when the fixing element is in the fixed state such that a load element can bear against a bearing point of a bearing element of the cantilever, wherein the load element can be moved with respect to the cantilever in a movement direction that is substantially parallel to the side wall, and which cantilever is coupled to the load element when the load element bears against the bearing element of the cantilever such that a movement force component acts on the cantilever in the movement direction due to a movement of the load element, which leads to a torque on the cantilever by means of a lever arm that reaches from the fixing point to the bearing point; and
 at least one rotation-reducing element, which is connected at one end to the cantilever and is designed to rest against the side wall by means of a different end when the load element bearing against the cantilever moves in order to counteract the torque on the cantilever.

2. The supporting device as per claim 1, wherein the rotation-reducing element has a length from one end to the other end that is configured for reducing a rotational movement of the cantilever due to the torque on the cantilever such that the cantilever is prevented from folding or pivoting away around the fixing point.

3. The supporting device as per claim 2, wherein the rotation-reducing element has a length from one end to the other end that is configured for reducing a rotational movement of the cantilever due to the torque on the cantilever such that the cantilever is prevented from folding or pivoting away about a first pivot axis, which is perpendicular on the side wall and comprises the fixing point, and/or about a second pivot axis, which lies in a plane of the side wall and comprises the fixing point.

4. The supporting device as per claim 1, wherein the rotation-reducing element is designed as a support wing having an elongate shape in the form of: a solid body, or a hollow body having a tubular profile.

5. The supporting device as per claim 1, wherein, when the fixing element is in the fixed state, the rotation-reducing element extends away from the cantilever substantially in the movement direction and/or an additional rotation-reducing element extends away from the cantilever in a direction that is substantially opposite the movement direction.

6. The supporting device as per claim 1, wherein, when the fixing element is in the fixed state, one end of the rotation-reducing element/an additional rotation-reducing element is connected to an end portion of the cantilever, which end portion faces the side wall.

7. The supporting device as per claim 1, wherein, when the fixing element is in the fixed state, rotation-reducing element an additional rotation-reducing element comprises a recess on a side of the rotation-reducing element/an additional rotation-reducing element that faces the side wall such that a wedge can be arranged between the rotation-reducing element/additional rotation-reducing element and the side wall so as to be guided by the recess, at least in part, such that, when the fixing element is in the fixed state, the wedge is pressed against the side wall in order to brace the supporting device.

8. The supporting device as per claim 1, wherein an other end of a rotation-reducing element/additional rotation-reducing element protrudes relative to a side of the fixing element, which faces the side wall, by a protrusion in the direction of the side wall in a plane that is perpendicular to the movement direction such that, when the fixing element is in the fixed state, the protrusion is pressed against the side wall and the supporting device is.

9. The supporting device as per claim 1, wherein the bearing element of the cantilever is connected to the fixing element when the fixing element is in the fixed state so as to be rotatable around a substantially horizontal first rotary shaft that extends substantially in parallel with the side wall.

10. The supporting device as per claim 9, wherein an other end of a rotation-reducing element/additional rotation-reducing element is formed by a bearing element having a bearing surface that faces the side wall when the fixing element is in the fixed state, wherein the bearing surface is curved concentrically to the first rotary shaft of the bearing element of the cantilever in a plane that is perpendicular to the movement direction in the direction of the side wall such that, when the bearing element of the cantilever is oriented substantially horizontally and at different positive or negative inclination angles of the side wall with respect to the vertical in a plane that is perpendicular to the movement direction, the side wall forms a tangent on the bearing surface that faces the side wall.

11. The supporting device as per claim 10, wherein the bearing surface is serrated, having teeth that run in the movement direction and are oriented in the direction of the side wall when the load element bearing against the cantilever moves, wherein the teeth are configured to act as spikes when they rest against the side wall.

12. The supporting device as per claim 11, wherein the other end of the rotation-reducing element/additional rotation-reducing element protrudes relative to a side of the fixing element, which faces the side wall, by a protrusion in the direction of the side wall in a plane that is perpendicular to the movement direction such that, when the fixing element is in the fixed state, the protrusion is pressed against the side wall and the supporting device is braced, wherein the protrusion is formed by the teeth.

13. The supporting device as per claim 10, wherein the bearing element is connected to the cantilever so as to be horizontally moveable in a plane that is perpendicular to the movement direction when the fixing element is in the fixed state.

14. The supporting device as per claim 9, wherein the cantilever comprises a first support element in addition to the bearing element, wherein the bearing element is connected to the fixing element at one end so as to be rotatable about the first rotary shaft and at the other end to the first support element so as to be rotatable around a substantially horizontal second rotary shaft that extends substantially in parallel with the side wall when the fixing element is in the fixed state, the end of which first support element that faces the side wall being connected to the fixing element so as to be rotatable around a substantially horizontal third rotary shaft that extends substantially in parallel with the side wall when the fixing element is in the fixed state.

15. The supporting device as per claim 14, wherein the bearing element is connected at the other end to a second support element so as to be rotatable about the substantially horizontal second rotary shaft that extends substantially in parallel with the side wall when the fixing element is in the fixed state, the end of which second support element that faces away from the bearing element is connected to the first support element by means of a substantially horizontal additional rotary shaft that extends substantially in parallel with the side wall, wherein a third support element is connected at one end to the end of the second support element that faces away from the bearing element and at the other end to the first rotary shaft, wherein the side wall in particular comprises a negative inclination angle with respect to the vertical.

16. The supporting device as per claim 14, in which the support element is formed as a telescope, such that, at different positive or negative inclination angles of the side wall, a substantially horizontal orientation of the bearing element of the cantilever is ensured.

17. An arrangement consisting of at least two supporting devices arranged next to one another in the movement direction as per claim 15, at least two supporting devices arranged next to one another in the movement direction when the fixing element is fixed to the fixing point of the side wall that has a negative inclination angle with respect to the vertical, wherein the supporting devices are each designed as deck slab brackets, one supporting device comprising the rotation-reducing element that extends away from the cantilever substantially in the movement direction when the fixing element is in the fixed state, the other supporting device comprising another/an additional rotation-reducing element that extends away from the cantilever in the direction that is substantially opposite to the movement direction when the fixing element is in the fixed state, and the supporting devices are interconnected by at least one longitudinal strut.

18. An incremental launching device comprising at least one supporting device according to claim 1 and slab formwork comprising a formwork shell carrier element that is formed to shape an underside of a deck slab, wherein the supporting device is formed as a deck slab bracket and comprises a support head at an end that faces the slab formwork, wherein the support head is connected to the bearing element of the cantilever and comprises a roller for bearing against a longitudinal carrier of the slab formwork.

19. The incremental launching device as per claim 18, wherein the cantilever is provided with a lowering apparatus comprising a reciprocating piston, a support base and comprising a locking device, wherein the reciprocating piston is movably mounted in the support base and can be moved into a formwork-removal position from a formwork-erection position and can be locked in the pushed-out operating position by means of the locking device, wherein the locking device is provided with a rotary bearing and a cam lever, wherein the cam lever is rotatably fastened in the rotary bearing and the reciprocating piston and the support base are supported against one another in the working position by means of the cam lever, and the support base and/or the reciprocating piston form the support head at one end.

20. A method for supporting a load element during an incremental launching method, in the construction industry by means of a supporting device, comprising a fixing element, a cantilever and at least one rotation-reducing element, comprising the steps of:

positioning the fixing element against a side wall and fixing the fixing element to a fixing point of the side wall, connecting the cantilever to the fixing element, protruding the cantilever from the side wall, bearing the load element against a bearing point of a bearing element of the cantilever, moving the load element with respect to the cantilever in a movement direction substantially in parallel with the side wall, coupling the cantilever to the load element such that a movement force component acts on the cantilever in the movement direction due to a movement of the load element, which component leads to a torque on the cantilever by means of a lever arm that reaches from the fixing point to the bearing point, connecting one end of the rotation-reducing element to the cantilever, and bearing another end of the rotation-reducing element against the side wall in order to counteract the torque on the cantilever.

21. The method for supporting a load element as per claim 20, in which the rotation-reducing element extending substantially in the movement direction away from the cantilever and/or an additional rotation-reducing element extending in a direction that is substantially opposite the movement direction away from the cantilever is/are connected to the cantilever, the other end of the rotation-reducing element and/or of the additional rotation-reducing element in each case is formed so as to protrude relative to a side of the fixing element that faces the side wall in the direction of the side wall by means of a protrusion in a plane that is perpendicular to the movement direction, the fixing element is fixed, the protrusion/protrusions is/are pressed against the side wall, and the supporting device is braced.

22. The method for supporting a load element as per claim 20, in which rotation-reducing element/an additional rotation-reducing element is provided with a recess on a side of the rotation-reducing element/additional rotation-reducing element that faces the side wall, a wedge is arranged between the rotation-reducing element/additional rotation-reducing element and the side wall so as to be guided by the recess, at least in part, and the wedge is pressed against the side wall in order to brace the supporting device.

\* \* \* \* \*